United States Patent

Mayaud

[15] 3,661,580

[45] May 9, 1972

[54] PHOTOGRAPHIC METHOD FOR PRODUCING A CATHODE-RAY TUBE SCREEN STRUCTURE

[72] Inventor: Edith Ellen Mayaud, Lancaster, Pa.

[73] Assignee: RCA Corporation

[22] Filed: Jan. 30, 1970

[21] Appl. No.: 7,138

[52] U.S. Cl. ....................96/36.1, 117/33.5 CM, 313/92 CS

[51] Int. Cl. ....................G03c 5/00

[58] Field of Search ....................96/36.1; 117/33.5 CM; 313/92 CS, 92 B, 92 PD

[56] References Cited

UNITED STATES PATENTS

| | | | |
|---|---|---|---|
| 3,146,368 | 8/1964 | Fiore et al. | 96/36.1 |
| 3,365,292 | 1/1968 | Fiore et al. | 96/36.1 |
| 3,226,246 | 12/1965 | Vermeulen et al. | 96/36.1 |
| 3,514,287 | 5/1970 | Donahue et al. | 96/36.1 |
| 3,287,130 | 11/1966 | Kaplan | 96/36.1 |
| 3,533,791 | 10/1970 | Angelucci | 96/38.3 |

*Primary Examiner*—Norman G. Torchin
*Assistant Examiner*—John Winkelman
*Attorney*—Glenn H. Bruestle

[57] ABSTRACT

A method for preparing a screen structure comprising a light-absorbing layer or matrix having therein an array of discretely-sized holes filled with luminescent material. A stencil having an array of opaque areas, which areas are larger than the desired holes, is produced on a supporting surface. A photopolymeric film is deposited over the stencil and supporting surface, and light is passed through the surface and stencil, thereby exposing the film. The light in the film is scattered so that the exposed areas extend behind the opaque areas of the stencil producing unexposed areas in the film which are substantially the same size as the desired holes. The unexposed areas of the film and the opaque portions of the stencil are removed, while the exposed areas of the film are retained in place. The retained exposed areas are rendered light-absorbing and the holes therein are filled with luminescent material.

9 Claims, 10 Drawing Figures

INVENTOR.
Edith E. Mayaud
BY
L. Greenspan
ATTORNEY

INVENTOR.
Edith E. Mayaud
BY
L. Greenspan
ATTORNEY

PHOTOGRAPHIC METHOD FOR PRODUCING A CATHODE-RAY TUBE SCREEN STRUCTURE

BACKGROUND OF THE INVENTION

Color television picture tubes which include a light-absorbing matrix as part of the screen structure have been described previously. In one form, the tube includes an aperture mask (also called a shadow mask) having an array of apertures therein closely spaced from the inner surface of the glass viewing panel of the tube. A light-absorbing layer or matrix having an array of holes or openings therein filled with luminescent material resides on the inner surface of the viewing panel. In one form of tube, each aperture in the mask has three related smaller sized holes in the matrix, each hole being filled with a different color emission luminescent material.

It has been suggested to produce the light-absorbing matrix by photographic projection through the aperture mask used as a master. Since the matrix holes are smaller than the mask apertures, the photographic process is modified to alter the exposure and/or the development of the matrix so as to achieve the desired size reduction. Such modifications are difficult to control and/or are too limited in the amount of size reduction that can be achieved.

SUMMARY OF THE INVENTION

The novel process produces a screen structure for a cathode-ray tube including a light-absorbing layer or matrix having an array of holes therein. In the novel process, a stencil having an array of opaque areas is produced on a supporting surface, such as the inner surface of the viewing panel of a cathode-ray tube. The opaque areas of the stencil have the correct center to center spacing but are larger in size than the desired holes in the matrix. (The stencil is preferably made photographically by back exposure using a process which includes projecting light through the apertures of an aperture mask which has been positioned in the viewing panel, incident upon a photopolymeric layer on the inner surface of the viewing panel.)

A photopolymeric film is deposited over the stencil and supporting surface and exposed by front flood exposure; that is, light is passed through the supporting surface and stencil to expose the film. At least a portion of the light in the film is scattered during this exposing step so that the exposed areas of the film extend behind the opaque areas of the stencil leaving the unexposed areas of the film substantially the same sizes as the desired matrix holes. This scattering may be achieved, for example, by including light-scattering particles in the film, or by overcoating the film with a light-scattering layer, or by placing a reflective light-scattering surface adjacent to the film.

After the film is exposed by scattering light, the unexposed areas of the film are removed, while the exposed areas are retained in place. The retained film areas are rendered light-absorbing; the stencil is removed; and the holes left in the film are filled with luminescent material.

By using a light-scattering layer, the exposure and development of the photopolymeric film are less critical than in previous processes. Also, by the novel process, a greater controlled reduction from mask aperture size to matrix hole size may be achieved than by previous processes. This permits larger mask apertures relative to the matrix holes to be used. As a result, the dimensional tolerance of electron beam landing in the finished tube is relaxed.

DESCRIPTION OF THE PREFERRED EMBODIMENTS

Example 1

Figure 1:
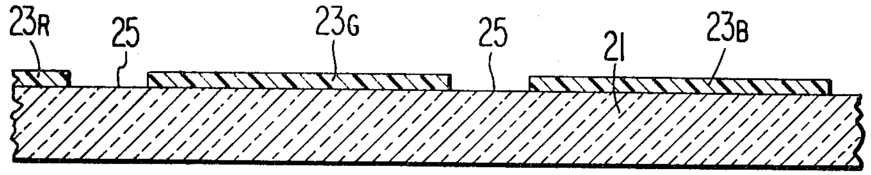
FIGS. 1 through 6 are fragmentary sectional views through a fragment of the faceplate panel of a cathode-ray tube showing different stages of completion of a screen structure prepared by one embodiment of the novel method.

FIGS. 1 through 6 illustrate some of the steps, according to one embodiment of the invention, used in preparing a screen structure comprising a light-absorbing matrix having an array of holes or openings therein filled with luminescent material for a shadow mask type color television picture tube. FIG. 1 shows a fragment of the viewing panel 21 for this tube having thereon a stencil comprised of an array of opaque areas 23R, 23G, and 23B. The stencil may be prepared by the following steps. The inner surface 25 of the viewing panel 21 is cleaned, coated with an aqueous solution containing 3 weight percent USP gelatin and 1 weight percent neutralized ammonium dichromate as a photosensitizer, and then dried.

The shadow mask associated with the panel 21 is positioned on its studs and then placed on a first lighthouse where light from a small area source at a first position is projected through the mask incident upon the coating to expose one set of areas designated 23R for the red-emitting luminescent material. The panel 21 is placed on a second lighthouse where light from a small area source at a second position is projected through the mask incident upon the coating to expose a second set of areas designated 23G for the green-emitting luminescent material. The steps are repeated in a third lighthouse with the small area light source at a third position to produce a third set of areas designated 23B for the blue-emitting luminescent material. In a typical process, an aperture mask having apertures of about 15.5 mils diameter is placed on a lighthouse having a 1,000 watt BH6 mercury vapor lamp in a light box with a light pipe or "collimator" that terminates in a 150 mil diameter tip, which constitutes the small area light source. A 10 minutes exposure of the coating with the light source positioned about 14 inches from the aperture mask on the lighthouse produces exposed areas which are about 16.5 mils in diameter.

The aperture mask is now removed from the panel 21 and the exposed gelatin layer is saturated with an alcohol solution of nigrosine black dye, which is applied by spraying or flow coating, and then dried. The dyed and exposed layer is developed in a stream of cool water for about 15 minutes and then in a stream of 45° C. water for about 60 seconds and then dried. The water stream dissolves away the unexposed portions of the gelatin layer leaving the dyed exposed areas 23R, 23G, and 23B in place as shown in FIG. 1, which dyed areas comprise the opaque areas of the stencil.

Figure 2:
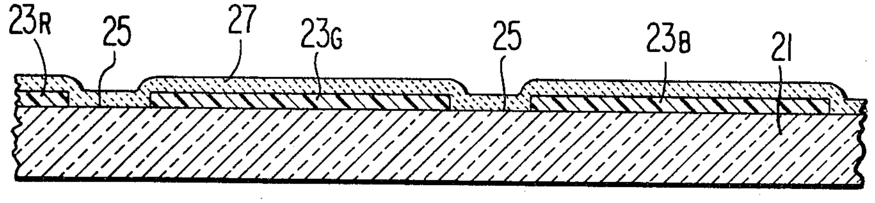
Figure 3:
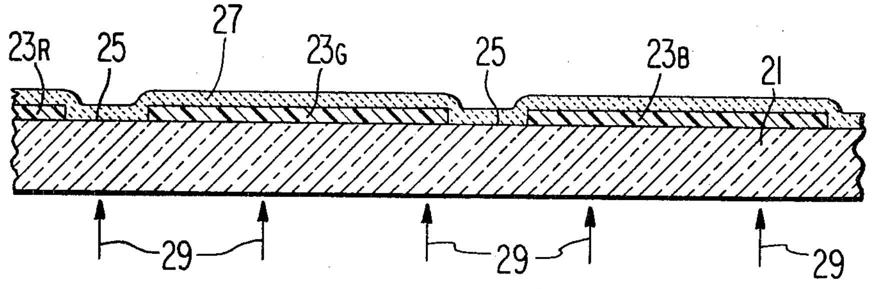

The opaque areas of the stencil and the bare surface areas 25 of the panel 21 are coated with an aqueous solution containing 15 weight percent manganese oxalate, 5 weight percent 50-42 polyvinyl alcohol and 0.5 weight percent ammonium dichromate sensitizer for the polyvinyl alcohol. The slurry is spin coated on and then dried, producing a film 27 of photopolymeric material as shown in FIG. 2.

The panel is now placed opposite a bank of ultraviolet emitting lamps with the stencil and coating on the remote side of the panel 21 from the lamp. Light from the lamp as shown by the arrows 29 in FIG. 3, flooding the panel passes through the clear areas of the stencil exposing portions of the layer 27 not masked by the stencil. An exposure of about 15 minutes to three 40-watt fluorescent lamps spaced about 8 inches from the panel has been found to be satisfactory. The manganese oxalate in the film 27 is pinkish white in color, and particles thereof in the film 27 scatter the light therein so that portions of the film a short distance behind the opaque areas 23R, 23G and 23B are exposed. During a typical exposure, the film 27 is exposed inward behind opaque areas leaving unexposed areas about 13 mils in diameter behind the opaque areas.

Figure 4:
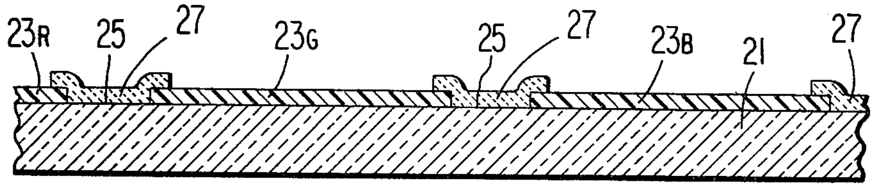

The layer 27 is developed by applying a spray of deionized water with a line pressure of about 25 pounds per square inch for about 1 to 2 minutes until the unexposed areas of the film are completely dissolved and are free of manganese oxalate. The exposed areas of the film 27 are retained in place and overlap the opaque areas of the stencil, as shown in FIG. 4. Although not preferred, the structure may be washed at this point with dilute aqueous ammonium hydroxide to convert part or all of the manganese oxalate to black manganese oxide.

Figure 5:
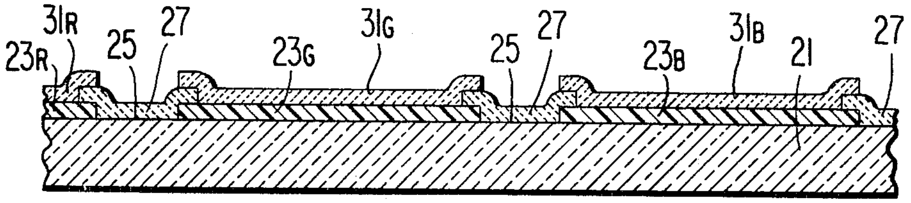

Now, red-emitting dots 31R of luminescent materials, green-emitting dots 31G of luminescent materials and blue-emitting dots 31B of luminescent materials are deposited photographically in the usual manner for a shadow mask tube, producing the structure shown in FIG. 5. Typically, the matrix is coated with green-emitting phosphor particles in a photopolymeric binder, the coating exposed in a lighthouse though the mask and the exposed coating developed to produce the green-emitting dots 31G. Then the sequence is repeated with blue-emitting phosphor and again repeated with red-emitting phosphor to produce the blue-emitting dots 31B and red-emitting dots 31R. Next the structure is filmed and a layer of aluminum metal is vapor deposited upon the structure.

Figure 6:
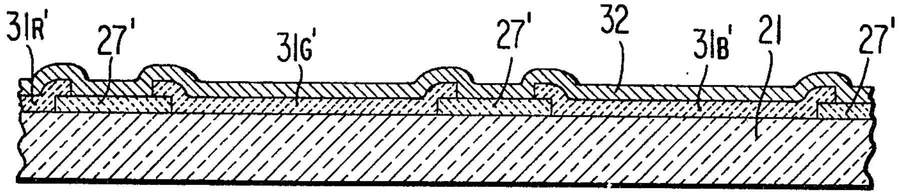

Finally, the structure is baked, generally at temperatures of about 400° to 450° C., in air to remove volatile matter. During this baking, the stencil, including any dye contained therein, is volatilized along with other organic matter and any manganese oxalate present is converted to black manganese oxide. The finished screen structure is shown in FIG. 6 comprising a light-absorbing matrix 27' having therein an array of holes filled with luminescent materials 31R', 31G' and 31B' and a layer of specular aluminum 32 over the luminescent materials. The panel may now be assembled into a cathode-ray tube, such as a color television picture tube, by known processing techniques.

Example 2

The procedure in this example is the same as for Example 1 except that the stencil is made by the following steps with reference to FIGS. 1 and 2. The inner surface 25 of the panel 21 is cleaned and coated with an aqueous solution containing 3 weight percent 50-42 polyvinyl alcohol and 0.5 weight percent sodium dichromate as a photosensitizer, and then dried. The shadow mask associated with the panel 21 is positioned on its studs and then back exposed three times as described in Example 1. The aperture mask is now removed from the panel 21 and the exposed polyvinyl alcohol layer developed in a stream of warm water for about 15 minutes. The water stream washes away the unexposed portions of the layer leaving the exposed portions in place. Now the retained exposed portions of the layer are dyed to render them opaque. To this end, an aqueous solution, containing about 5 percent nigrosine black dye, is applied, as by slurrying, to the layer and permitted to dry. An aqueous 1.0 weight percent solution of a heavy metal salt, such as barium acetate, is sloshed over the dye to set or insolubilize the dye on the exposed portions of the layer. Then, the entire surface is washed for about 15 minutes in a stream of warm water and then in a stream of 45° C. water for about 1 minute, and then dried. The insolubilized dye is absorbed into and on the retained exposed portions of the layer and washed away in the areas between. This procedure produces a stencil with better cleanup of dye, better dot definition and better opacity than the procedure described in Example 1. The steps for producing the matrix and luminescent areas are the same as for Example 1.

GENERAL CONSIDERATIONS AND ALTERNATIVES

The stencil may be prepared by any convenient process. In the examples, the stencil is prepared by exposing and developing a photopolymeric layer to produce a polymeric image which is then rendered opaque by saturation with a dye. Any negative acting photopolymeric material can be used in place of gelatin, such as polyvinyl alcohol, KPR, KOR, and fish glue. Any ultraviolet absorbing dye may be used to saturate the polymeric image. Generally, any material which renders the polymeric image nontransmitting (absorptive or reflective) may be used, for example particles of carbon, or metal, or a material such as silver chloride which can later be converted to an opaque material. Another alternative to making the stencil is first to deposit an opaque layer such as silver metal on the surface and a photoresist layer thereover. The photoresist layer is exposed to a light image and developed, and then the areas of the opaque layer not covered by the resist are dissolved away as with acid or other suitable reagent, leaving a stencil of opaque areas. Still another method of making a stencil is to use a silver halide emulsion layer which is exposed and developed in the usual way to produce opaque areas.

In the preferred embodiment, the stencil is coated with a film 27 of photopolymeric material containing a light-scattering material. Then, the film is front flooded through the faceplate panel to produce a hardening or insolubilizing of the film. Due to the scattering of light in the film, additional hardening takes place inward from the edge of and behind the opaque areas of the stencil. After the correct exposure to give the final desired hole size, development of the light-scattering film leaves a hole behind each opaque area of the stencil. When the light-scattering material is a material which upon baking converts to a permanent light-absorbing layer, such as a manganese oxalate or manganese tartrate being converted to manganese oxide, the development step is sufficient but otherwise, the printed pattern of the film must be blackened with a permanent opaquing material in order to produce the light-absorbing matrix.

Any of a large number of organic or inorganic light-scattering materials which do not blacken may be used in the photopolymeric film. Some examples are titanium dioxide, acrylic beads and aluminum oxide. Alternatively, an organic or inorganic light-scattering material may be used and the flood-exposed film subsequently blackened with a permanent blackening material such as graphite. Another alternative is for the permanent blackening material such as channel black or graphite to be incorporated directly in the photopolymeric film.

Figure 7:
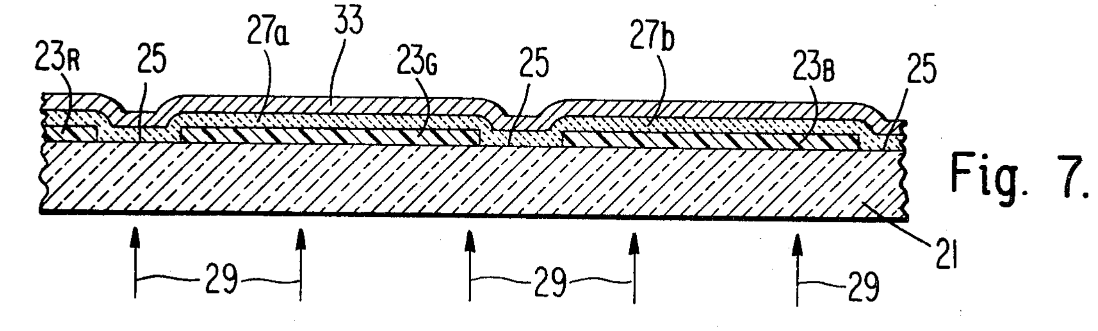
FIGS. 7 and 8 are fragmentary sectional views through a faceplate panel showing two alternative ways for producing light scattering in other embodiments of the novel method.
Figure 8:
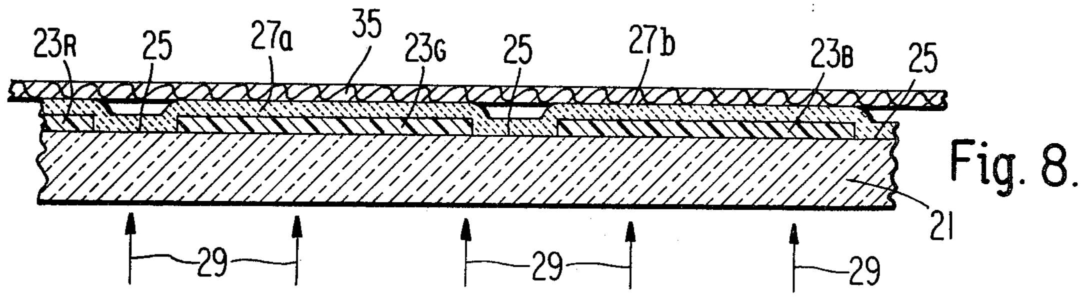

FIG. 7 illustrates an alternative method for achieving light-scattering. In FIG. 7, which should be compared with FIG. 3, the stencil is coated with a clear photopolymeric film 27*a*, which is overcoated with a light-scattering layer 33 comprised, for example, of silica particles with or without a binder. Light flooding through the panel 21 and the stencil 23 passes through the film 27*a* and is scattered back off the overcoating 33 thereby exposing the film behind the opaque areas 23R, 23G and 23B. In still another alternative shown in FIG. 8, a reflective surface, such as a paper sheet 35 is placed behind a clear photopolymeric film 27*a* to scatter light which has passed through the stencil and film. The alternatives shown in FIGS. 7 and 8 have the advantage of having a clear spacer layer which permits somewhat greater penetration of scattered light behind the opaque areas of the stencil.

Any negative acting photopolymeric may be used in the films 27 and 27*a*. Polyvinyl alcohol sensitized with a dichromate is preferred. Sensitized gelatin, glue, shellac, KPR or KOR may also be used. The exposure is tailored to the particular photopolymeric material used and to the particular application. Developing the exposed film is also tailored to the particular photopolymeric material and to the particular application. When a dye or other volatile organic material such as carbon is used as a stencil material, clearing of the hole may take place during baking out of the panel. Developing of the film can be accomplished with a solubilizing reagent for the blackening pigment; for example, an acid which dissolves metals or their salts, where the stencil is constituted of all metal salts. When the stencil is comprised of a polymeric material, developing of the film can also be achieved by applying a reagent which attacks the polymer. For example, when gelatin is used in the stencil and shellac is used to print the light-absorbing matrix, aqueous hydrogen peroxide may be used to strip out the gelatin and develop the matrix. When gelatin is used in the stencil and polyvinyl alcohol is used in forming the matrix, then an enzyme, such as gelatinase, can be used to develop the matrix.

Figure 9:
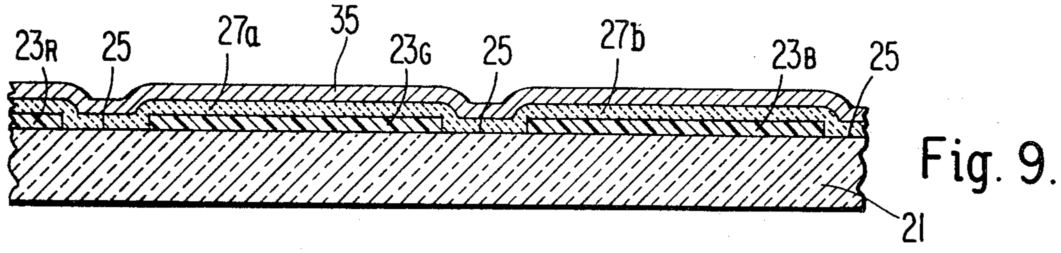
FIGS. 9 and 10 are fragmentary sectional views through a faceplate panel illustrating an alternative way of rendering the matrix light absorbing.
Figure 10:
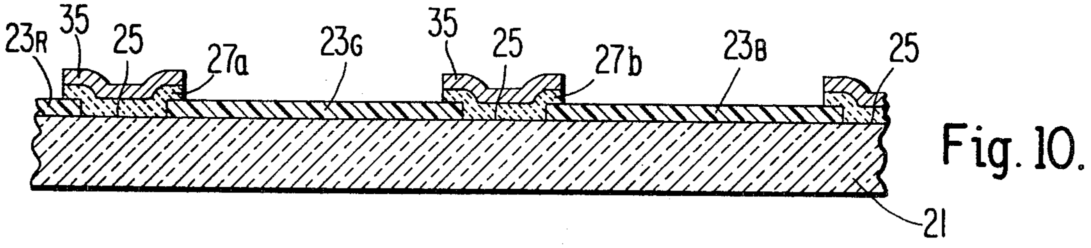

In the preferred embodiment, the light-scattering material is such that when heated, it renders the retained film areas opaque, thereby producing the desired light-absorbing quality to the matrix. This may be achieved with a number of metal salts. Such a material may also be incorporated in the scattering layer 33 in FIG. 7. In some embodiments of the invention, the material for rendering the retained film regions blackened or otherwise rendered opaque is introduced after exposure, as would be necessary for the structure shown in FIG. 8. This may be achieved by overcoating the exposed film 27A with a layer 35 of an opaque material such as graphite, manganese dioxide or iron oxide in a blinder as shown in FIG. 9. In the development of the film 27A, the opaque material overlying the retained film regions is retained, while the rest of the overcoating is carried away during development yielding the structure shown in FIG. 10.

After the light-absorbing matrix processing by any of the alternatives is completed, the structure is rinsed with water, dried for about 4 minutes with the aid of infrared heat and the desired luminescent material deposited thereon by any of the known photographic techniques using the same aperture mask that had been used for making the matrix. It will be noted that the phosphor dots are somewhat larger than the holes in the light-absorbing matrix and also larger than the apertures in the aperture mask. The completed structure is illustrated in FIG. 6, which shows the light-absorbing matrix with the smaller holes therein and the larger phosphor dots being substantially concentric therewith. A suitable process for depositing the phosphor dots 23R, 23G and 23B is described in an article entitled, "Color-Television Screening by the Slurry Process," By T. A. Saulnier, Jr. in *Electrochemical Technology*, 4,27–31 (1966).

The luminescent screen may now be processed in the usual way to apply a reflective metal layer on top of the phosphor dots and the light-absorbing matrix. The screen structure is then baked at temperatures between about 400° and 450° C. and then assembled with the aperture mask into a cathode-ray tube in any of the known procedures. A suitable process for filming and metalizing the screen structure is described in an article entitled, "Emulsion Filming with Color Television Screens," T. A. Saulnier, Jr. in *Electrochemical Technology*, 4, 31–34, (1966).

I claim:

1. In a method for producing a screen structure for a cathode-ray tube comprising a light-absorbing layer having therein an array of light-transmitting holes filled with luminescent material, the steps including:

1. producing upon a transparent supporting surface a stencil comprising an array of opaque areas corresponding to said array of holes, which opaque areas are larger than the desired holes in said screen structure,
2. depositing upon the stencil and supporting surface a photopolymeric film whose solubility in a solvent is lowered when it is exposed to light,
3. passing light through said surface and stencil to selectively expose said film,
4. scattering at least a portion of the light reaching the film during the exposing step to produce unexposed areas of said film substantially the same sizes as the desired holes in said light-absorbing layer,
5. developing said film to remove said unexposed areas of said film while retaining the exposed areas, and removing said stencil, thereby producing said array of holes in said film,
6. and then filling said holes with luminescent material.

2. The method defined in claim 1 wherein the stencil is produced by steps comprising:

i. coating the supporting surface with a layer of polymeric material whose solubility in a solvent is lowered when it is exposed to light,
ii. exposing portions of said layer of polymeric material to light at locations where holes in said light-absorbing layer are desired,
iii. removing unexposed portions of said layer of polymeric material while retaining the exposed portions thereof,
iv. and rendering said retained exposed portions opaque to form said opaque areas of said stencil.

3. The method defined in claim 1 wherein the stencil is produced by steps comprising:

i. coating the supporting surface with a layer of opaque material,
ii. overcoating said layer of opaque material with a layer of polymeric material whose solubility in a solvent is lowered when it is exposed to light,
iii. exposing portions of said layer of polymeric material to light, locations where holes in said light-absorbing layer are desired,
iv. removing unexposed portions of said layer of poly-meric material while retaining the exposed portions thereof,
v. and removing all of the layer of opaque material except those portions underlying said retained exposed portions of said layer of polymeric material, which retained opaque material comprises said opaque areas of said stencil.

4. A method for producing a screen structure for a cathode-ray tube having a screen structure including (a) a light-absorbing layer having therein an array of light-transmitting holes filled with luminescent material and (b) a shadow mask spaced from said layer, said mask having therein an array of apertures that are larger in size than said holes, the steps comprising:

1. producing upon a transparent supporting surface a stencil comprising an array of opaque areas corresponding to said array of holes which opaque areas are similar in size to the holes in said mask,
2. deposition upon said stencil and supporting surface a film comprised of polymeric material whose solubility in a solvent is lowered when it is exposed to light,
3. passing light through said surface and stencil to expose selectively said film,
4. scattering at least a portion of the light in said film during said exposing step to produce unexposed areas of the film substantially the same sizes as the desired holes in said light-absorbing layer,
5. developing said film to remove said unexposed areas of said film while retaining the exposed areas of said film, thereby producing the desired holes in said film,
6. rendering said retained film areas light absorbing,
7. and filling said holes with luminescent mate -rail.

5. The method defined in claim 4 wherein said film contains light-scattering particles.

6. The method defined in claim 4 wherein said light scattering is produced by a layer containing light-scattering particles coated on said film.

7. The method defined in claim 4 wherein said light scattering is produced by a light-scattering surface placed against said film.

8. The method defined in claim 4 wherein said film in step (2) is comprised of (a) a water-soluble organic polymeric material which volatilizes upon heating and (b) a light-scattering, inorganic salt which, upon heating, decomposes to a dark-colored light-absorbing compound; and step (6) includes heating said retained exposed areas of the film to volatilize said polymeric material and to convert said inorganic salt to a dark-colored, light-absorbing compound.

9. The method defined in claim 4 wherein the stencil is produced by steps comprising:

a. coating the inner surface of the faceplate panel of the cathode-ray tube with a polymeric material whose solubility in a solvent is lowered when it is exposed to light,
b. positioning said shadow mask in a predetermined location with respect to said inner surface, c. projecting light from a substantially point source through said mask incident upon said coating, whereby portions of said coating become exposed, d. developing said coating to remove the unexposed portions thereof while retaining the exposed portions thereof, e. rendering said retained exposed portions substantially opaque by depositing dye material selectively only on said retained exposed portions.

* * * * *

UNITED STATES PATENT OFFICE

CERTIFICATE OF CORRECTION

Patent No. 3,661,580 Dated May 9, 1972

Inventor(s) Edith Ellen Mayaud

It is certified that error appears in the above-identified patent and that said Letters Patent are hereby corrected as shown below:

| | |
|---|---|
| Column 5, line 34 | change "By" to --by-- |
| Column 5, line 45 | after "Screens," insert --by-- |
| Column 6, line 17 | change "light, locations" to --light at locations-- |
| Column 6, line 19 | change "poly-meric" to --polymeric-- |
| Column 6, line 43 | change "light in said" to --light reaching said-- |
| Column 6, line 51 | change "mate-rail." to --material.-- |

Signed and sealed this 19th day of September 1972.

(SEAL)
Attest:

EDWARD M.FLETCHER,JR.
Attesting Officer

ROBERT GOTTSCHALK
Commissioner of Patents